United States Patent [19]

Sand

[11] 4,358,121
[45] Nov. 9, 1982

[54] RING GAP SEAL

[76] Inventor: Darrel R. Sand, 4777 Ottawa Dr., P.O. Box 244, Okemos, Mich. 48864

[21] Appl. No.: 155,609

[22] Filed: Jun. 2, 1980

[51] Int. Cl.³ .............................................. F16J 9/18
[52] U.S. Cl. ..................................... 277/218; 277/155
[58] Field of Search ....................... 277/216, 218–222, 277/155

[56] References Cited

U.S. PATENT DOCUMENTS

| 297,891 | 4/1884 | Wheelock | 277/218 X |
| 1,062,095 | 5/1913 | Hamel | 277/219 |
| 1,290,456 | 1/1919 | Wilson | 277/218 |
| 1,705,648 | 3/1929 | Schmitt | 277/218 X |
| 2,285,961 | 6/1942 | Finley | 277/219 |

FOREIGN PATENT DOCUMENTS 935104 11/1955 Fed. Rep. of Germany.
2408198 9/1975 Fed. Rep. of Germany.

Primary Examiner—Robert S. Ward, Jr.
Attorney, Agent, or Firm—Robert G. Mentag

[57] ABSTRACT

A ring gap seal for use on the top compression ring of a piston in an internal combustion engine, an air compressor, a fluid pump, a refrigeration pump, or a rotating shaft seal. In one embodiment, the ring gap seal comprises a lip portion adapted to be seated in a slot formed in the upper face of a compression ring and overlying the ring gap in the ring. The seal lip portion is carried by a supporting wall portion disposed at a right angle to the lip portion. A pair of integral spring arms are integral with the wall portion and they engage the inner wall of the ring groove of a piston in which the compression ring and gap seal are mounted so as to urge the seal lip portion outwardly. The explosive gas pressure created in the operation of the engine exerts a downward and outward pressure on the gap seal to seal the top and inner ends of the compression ring gap. In a modified embodiment, the spring arms are provided with elongated flanges at their outer ends which are seated in index slots in the piston ring groove wall. In another embodiment, a circumferential type ring gap seal has a sealing flange and a sealing wall portion. In the last mentioned embodiment, the compression ring is provided with an index slot for the reception of an index tab on the circumferential gap ring seal to prevent relative rotation between the compression ring and the circumferential gap seal.

10 Claims, 21 Drawing Figures

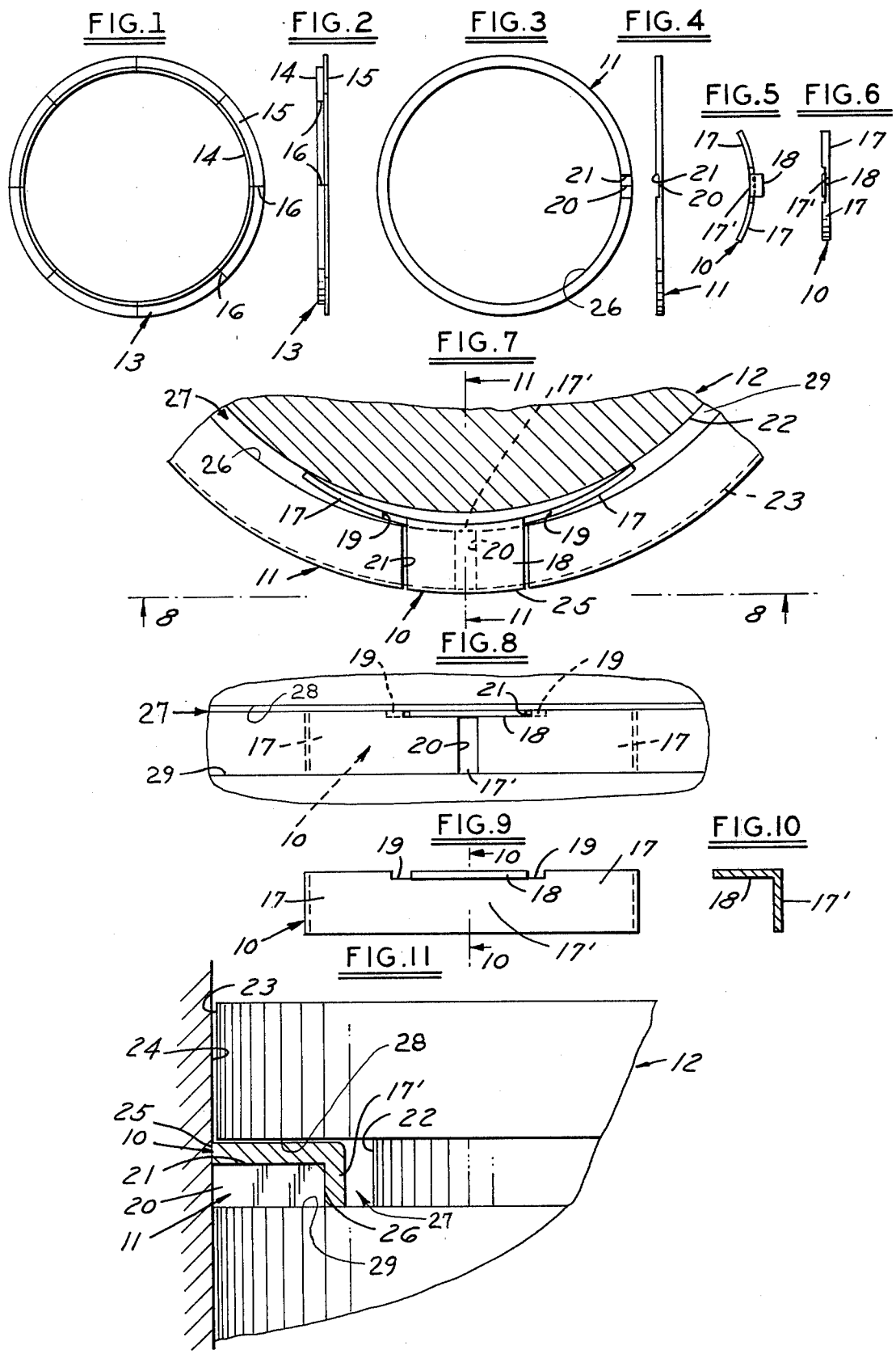

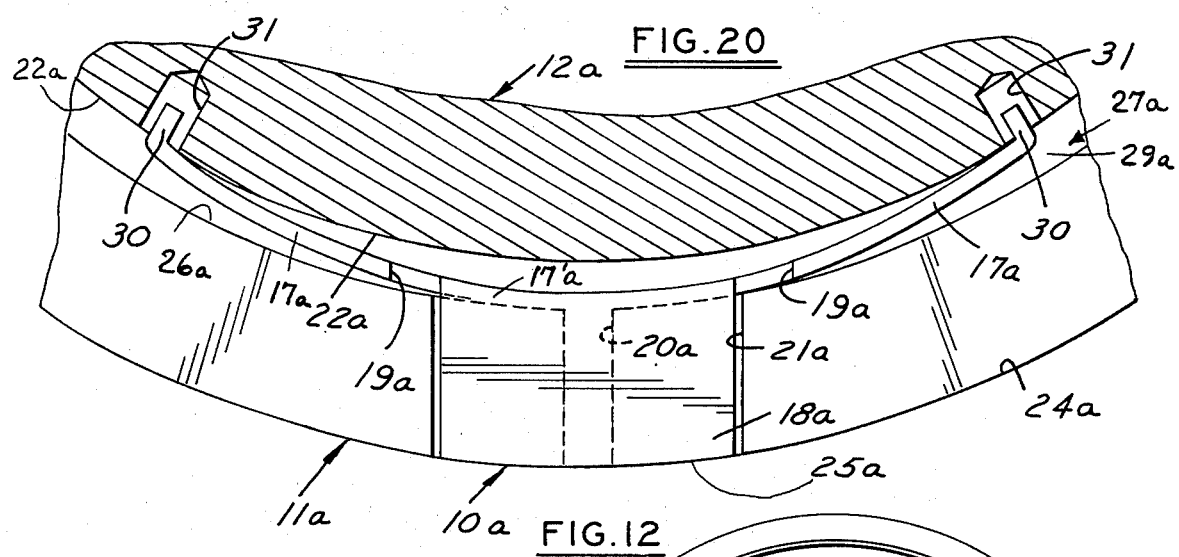
FIG. 20
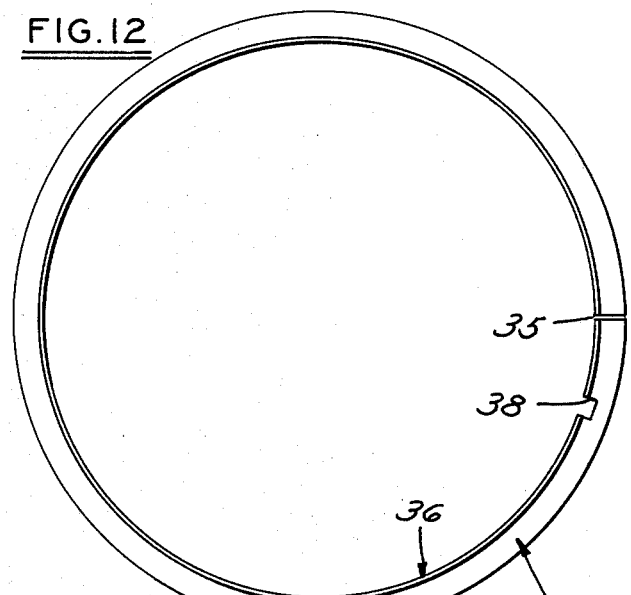
FIG. 12
FIG. 13
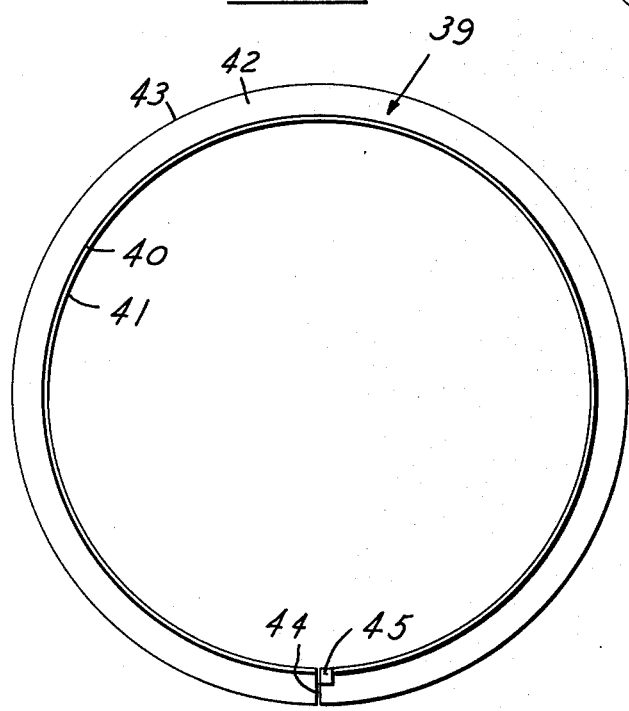
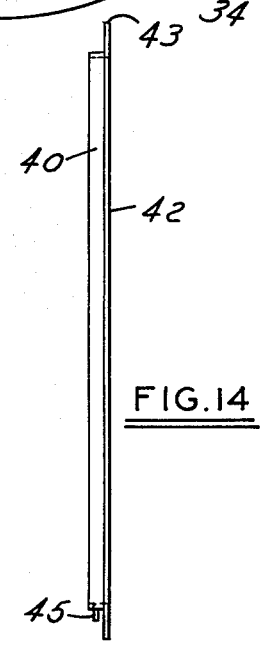
FIG. 14

RING GAP SEAL

BACKGROUND OF THE INVENTION

1. Field of the Invention

This invention relates to the internal combustion engine art, and more particularly, to an improved internal combustion engine piston ring gap seal. The invention is specifically concerned with a ring gap seal, for a piston compression ring, which is moved into a sealing position on a compression ring by gas pressure, to seal the inner end and top end of the ring gap in the compression ring.

2. Description of the Prior Art

It is well known in the internal combustion engine art to employ at least two compression rings on an engine piston to prevent blow-by of gas pressure past the piston ring during operation of an engine. Due to the inherent construction and operation of a compression ring, it is provided with a ring gap to allow for outward expansion and contraction during sliding engagement of the rings with the cylinder bore. The ring gap causes a certain amount of blow-by to exist which heretofore has not been avoidable with the prior compression ring structures. In order to overcome this blow-by, the size of the ring gap in the compression rings has been decreased, but such tactics have resulted in compression ring sticking, and increased compression ring friction, and engine wear.

Excessive costs are required in the control of small ring gaps in new engines. Normal new engine break-in causes immediate ring gap growth and an undesirable amount of blow-by for the life of the engine, until the excessive blow-by causes loss of engine efficiency. In order to overcome excessive blow-by, new rings are installed to decrease the ring gap.

SUMMARY OF THE INVENTION

In accordance with the present invention, a first embodiment comprises a seal lip portion adapted to be seated on the upper side of the ring gap of a piston compression ring. The seal lip portion has an outer arcuate periphery that is aligned with the outer periphery of the compression ring. The seal lip portion is integrally attached to a right angular inner wall portion that sealingly engages the inner end of the ring gap. The inner end wall portion is provided with a pair of integral spring arms that engage the inner end wall of a piston ring groove in a piston on which the compression ring is mounted to create an outward bias to hold the seal wall portion against the inner periphery of a compression ring to seal the ring gap. The spring arms are provided with notches, to allow passage therethrough of gas pressure created during the operation of the engine, for energizing the seal and creating an outward pressure on the seal to hold it in sealing engagement with the compression ring.

In a modified embodiment of the present invention, each of the spring arms of the ring gap seal is provided with an index flange on the free end mating engagement with an index slot in the inner wall of a piston ring groove in a piston. This ring gap seal is adapted for use in two-cycle engines.

Another embodiment of the invention comprises a circumferential type ring gap seal which includes a cylindrical wall portion that is integrally attached to an outwardly extended right angular flange portion. An index tab is struck from the cylindrical wall portion. The circumferential ring gap seal is adapted to be seated in a piston top compression ring, with its index tab seated in an index slot formed in the compression ring to prevent relative rotation between the compression ring and the ring gap seal. The flange of the ring gap seal is adapted to seal the top end of the compression ring gap and the cylindrical wall portion is adapted to seal the inner end of said ring gap. The circumferential ring gap seal is provided with a gap to allow the gas pressure during operation of the engine to be conveyed through the top side of the flange of the circumferential seal and into engagement with the seal flange and the inner side of the cylindrical wall portion of the seal to force the seal radially outward into a tight sealing engagement over the ring gap in a compression ring. In a modified embodiment of the circumferential ring gap seal, the inner flange is provided with an index tab which is in mating engagement with an index slot in the inner wall of a piston ring groove in a piston. This circumferential ring gap seal is adapted for use in 2-cycle engines. The ring gap seal of the present invention reduces the blow-by, and it eliminates the need for close ring gap dimensions. The ring gap seal of the present invention maintains a ring gap seal on both new and worn piston rings. Further advantages of the invention are set forth hereinafter.

BRIEF DESCRIPTION OF THE DRAWINGS

FIG. 1 is a top plan view of a seal ring workpiece from which a plurality of ring gap seals are formed.

FIG. 2 is a side elevation view of the seal ring workpiece shown in FIG. 1.

FIG. 3 is a top plan view of a typical piston top compression ring which is provided with a radial index or locating slot on the upper face thereof.

FIG. 4 is a side elevation view of the piston top compression ring shown in FIG. 3.

FIG. 5 is a plan view of a first embodiment ring gap seal made in accordance with the principles of the present invention.

FIG. 6 is a right side view of the ring gap seal shown in FIG. 5.

FIG. 7 is a fragmentary cross view of a piston and a piston top compression ring, and showing the compression ring provided with a ring gap seal of the present invention.

FIG. 8 is a front elevation view of the piston, piston top compression ring and piston ring gap seal illustrated in FIG. 7, taken along the line 8—8 thereof, and looking in the direction of the arrows.

FIG. 9 is a front elevation view of the ring gap seal shown in FIGS. 7 and 8.

FIG. 10 is an elevation section view of the ring gap seal illustrated in FIG. 9 taken along the line 10—10 thereof, and looking in the direction of the arrows.

FIG. 11 is a fragmentary, elevation section view of the piston, piston top compression ring and piston ring gap seal structure illustrated in FIG. 7, taken along the line 11—11 thereof, and looking in the direction of the arrows.

FIG. 12 is a top plan view of a typical piston top compression ring modified to include an index or locating slot.

FIG. 13 is a plan view of a circumferential type piston ring gap seal provided with an index tab for the second embodiment of a piston ring gap seal, made in accordance with the principles of the present invention.

FIG. 14 is a side elevation view of the circumferential type piston ring gap seal shown in FIG. 13.

FIG. 20 is a fragmentary, top plan view showing the modified piston top compression ring illustrated in FIG. 12 and the embodiment of piston ring gap seal illustrated in FIG. 15 modified with inwardly turned flanges and adapted for use in 2-cycle engines.

DESCRIPTION OF THE PREFERRED EMBODIMENTS

Figure 15:
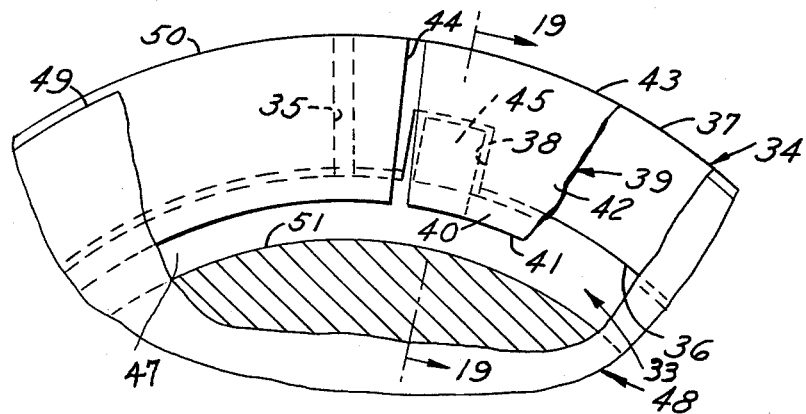
FIG. 15 is a fragmentary, top plan view showing the modified piston top compression ring illustrated in FIG. 12, and the ring gap seal of FIG. 13 mounted in operative relationship on a piston.

Referring now to the drawings, and in particular to FIGS. 1 through 7, the numeral 10 generally designates a piston ring gap seal made in accordance with the principles of the present invention and illustrating a first embodiment of the invention. The numeral 11 generally designates a typical piston top compression ring which is slightly modified, in accordance with the invention, for operative relationship with the piston ring gap seal 10. The numeral 12 generally indicates a typical piston in which the piston top compression ring 11 and piston ring gap seal 10 are operatively mounted.

The numeral 13 in FIGS. 1 and 2 generally designates a circular workpiece from which a plurality of piston ring gap seals 10 may be formed. As shown in FIGS. 1 and 2, the ring gap seal workpiece 13 is a ring member having an inner cylindrical wall 14 to which is integrally formed a radially and outwardly extended, integral, peripheral flange 15. The workpiece 13 is adapted to be cut into a plurality of equal arcuate length workpiece portions along the cut lines indicated by the numerals 16. The end portions of the flange 15 are then removed, in any suitable manner, to provide a remaining, integral, centrally located seal lip, as best seen in FIGS. 7 through 11. The cylindrical wall of each workpiece portion then forms a pair of spring arms 17 and an integral body portion 17' which is integrally attached to the seal lip 18. As shown in FIGS. 7, 8 and 9, a portion of each seal spring arm 17 is removed adjacent the seal lip 18 to form the notches 19.

FIGS. 3 and 4 illustrate a typical piston top compression ring 11 which is provided with the usual cut or gap 20. In accordance with the invention, a radial groove 21 is formed through the upper surface of the upper face of the compression ring 11, and it extends laterally from the gap 20 an equal distance on either side thereof.

FIG. 7 illustrates the ring gap seal 10 mounted in an operative position on the compression ring 11, in a piston top compression ring groove generally indicated by the numeral 27 of a piston 12. As best seen in FIG. 11, the ring groove 27 includes an inner end wall 22, a top end wall 28 and a bottom end wall 29. As shown in FIGS. 7 and 11, the numeral 23 designates the periphery or outer diameter of the piston land. In FIG. 11, the numeral 24 designates the cylinder bore on which the outer periphery of the piston ring 11 is seated. As shown in FIG. 11, the outer periphery 25 of the piston ring gap seal lip 18 is also sealingly engaged against the cylinder bore 24. As shown in FIG. 7, the spring arms 17 of the piston ring gap seal 10 abut the inner end wall 22 of the piston compression ring groove 27 to and bias the ring gap seal 10 outwardly into sealing engagement with the inner face of the compression ring 11 to seal the gas pressures from entering the inner end of the ring gap 20 during operation of an internal combustion engine. The piston ring gap seal lip 18 prevents gas pressures from entering the top end of the ring gap 20, as shown in FIG. 11.

In use, it will be seen that the gas pressures, due to combustion in an engine cylinder, will hold the ring gap seal 10 tightly in sealing position against the inner end of the ring gap 20 because the gas pressure is allowed to enter the space between the seal lip 18 and the side walls of the slot 21 which is formed in the upper face of the ring 11, as shown in FIG. 7, and to pass inwardly through the notches 19 in the spring arms 17 and into position between the inner wall of the ring piston groove 22 and the rear side of the spring arms 17.

It will be seen that the ring gap seal 10 reduces engine blow-by and eliminates the need for close ring gap dimensions for the ring gap 20. The elimination of the need of a tight ring gap 20 also eliminates ring sticking. The ring gap seal 10 of the present invention maintains ring sealing in both new and worn piston compression rings. The use of the ring gap seal 10 of the present invention reduces the need for two piston compression rings to one piston compression ring. Other advantages of the piston ring gap seal 10 is that it reduces ring friction, increases fuel economy, increases power output of an internal combustion engine reduces emissions, reduces contamination of engine oil, reduces engine wear, increases the life of lubricating oil, increases the life of oil filters, reduces oil sump capacity, and increases oil economy.

It will be understood that the ring gap seal 10 may be made from any suitable material as, for example, from stainless steel, and that it may be made to any desired dimensions in accordance with the dimensions of the piston 12 and the piston ring 11 with which it is associated.

FIG. 20 illustrates a second embodiment of the invention and the parts of the ring gap seal illustrated in FIG. 20 which are the same as the parts of the ring gap seal 10 illustrated in FIGS. 1, 2 and 5 through 11 have been marked with the same reference numerals followed by the small letter "a". The embodiment of FIG. 20 is provided with an integral, inwardly turned flange 30 on the outer end of each of the spring arms 17a. Each of the flanges 30 extends inwardly into an adjacent index slot or locating slot 31 that is formed in the inner face of the piston ring groove 27a. The ring gap seal 10a illustrated in FIG. 20 functions in the same manner as the first embodiment ring gap seal 10. The ring gap seal 10a of FIG. 20 is adapted for use in 2-cycle engines to prevent the piston ring gap 20a from traversing ports in the cylinder wall 24a.

FIGS. 12 through 19 disclose another embodiment of the invention which comprises a circumferential type piston ring gap seal made in accordance with the principles of the present invention. FIG. 12 is a plan view of a conventional piston compression ring, generally indicated by the numeral 34, which has been modified, in accordance with the invention, to provide an index or locating slot, indicated by the numeral 38 which is shown in an enlarged view of FIG. 18. The compression ring 34 includes the usual ring gap 35. The numerals 36 and 37 designate the inner and outer diameters, respectively, of the piston ring 34. An index slot 38 is located at a predetermined angular distance from the ring gap 35, as for example, 20°. In one embodiment, the index slot was 0.150" wide and approximately 0.125" deep.

Figure 17:
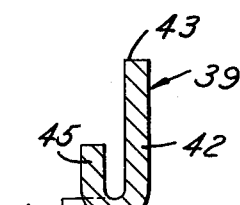
FIG. 17 is an elevation section view through the circumferential type piston ring gap seal structure of FIG. 16, taken along the line 17—17 thereof, and looking in the direction of the arrows.
Figure 16:
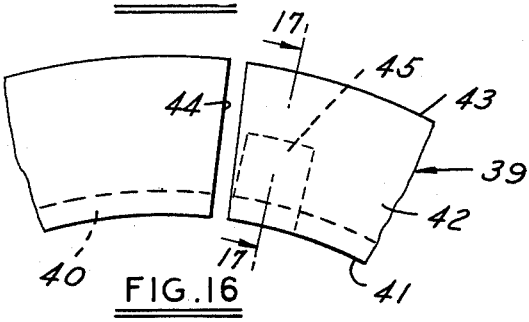
FIG. 16 is a fragmentary, top plan view of a portion of the circumferential type piston ring gap seal and index tab.
Figure 18:
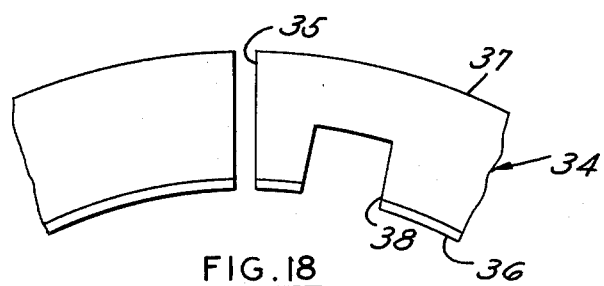
FIG. 18 is a fragmentary, top plan view of the piston compression ring structure illustrated in FIG. 12, showing an enlarged view of the index slot.
Figure 19:
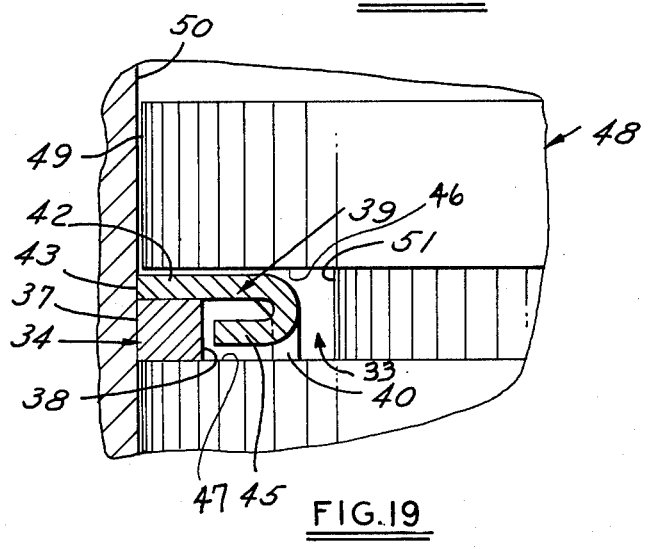
FIG. 19 is a fragmentary, elevation section view through the structure illustrated in FIG. 15, taken along the line 19—19 thereof, and looking in the direction of the arrows.

FIG. 13 is a plan view of the circumferential type ring gap seal which is generally indicated by the numeral 39. The ring gap seal 39 includes a cylindrical wall portion 40, attached to which is an integrally formed annular flange 42. The numeral 41 designates the internal diameter of the gap seal wall portion 40, and the numeral 43 designates the outer diameter of the annular flange 42. The circumferential ring gap seal 39 is provided with a seal gap 44, and an index tab 45 positioned adjacent the gap 44. As shown in FIG. 17, the index tab 45 is struck from the gap seal wall portion 40, and it is folded outwardly to a position parallel to the flange 42. FIGS. 15 and 19 illustrate the mounting of the circumferential type ring gap seal 39 on a compression ring 34, in a piston ring groove generally indicated by the numeral 33 of a piston generally indicated by the numeral 48. As best seen in FIG. 19, the ring groove 33 includes an inner end wall 51, a top end wall 46, and a bottom end wall 47. The numeral 49 designates the outer diameter of the piston land, and the numeral 50 designates the cylinder bore of an engine in which the piston 48 is operatively mounted. As shown in FIGS. 15 and 19, the index tab 45 is operatively seated in the indexing in slot 38 in the compression ring 34 to prevent relative rotational movement between the seal 39 and the compression ring 34.

In use, the circumferential type piston ring gap seal 39 provides a ring gap seal that achieves the same advantages listed for the first embodiment of FIGS. 1 through 11. It will be seen from FIGS. 15 through 19 that the gas pressure created during an internal combustion engine explosion, on the top of the piston 48, will pass down between the piston outer diameter 49 and the cylinder wall 50 and through the seal gap 44 to the inner or energizing side of the gap seal 39. The gas pressure on the gap seal 39 urges it downwardly into tight sealing engagement over the top of the ring gap 35, as shown in FIG. 15. The gas pressure also reacts against the inner periphery 41 of the gap seal 39 to hold the wall portion 40 of the gap seal 39 tight against the inner end of the ring gap 35.

Figure 21:
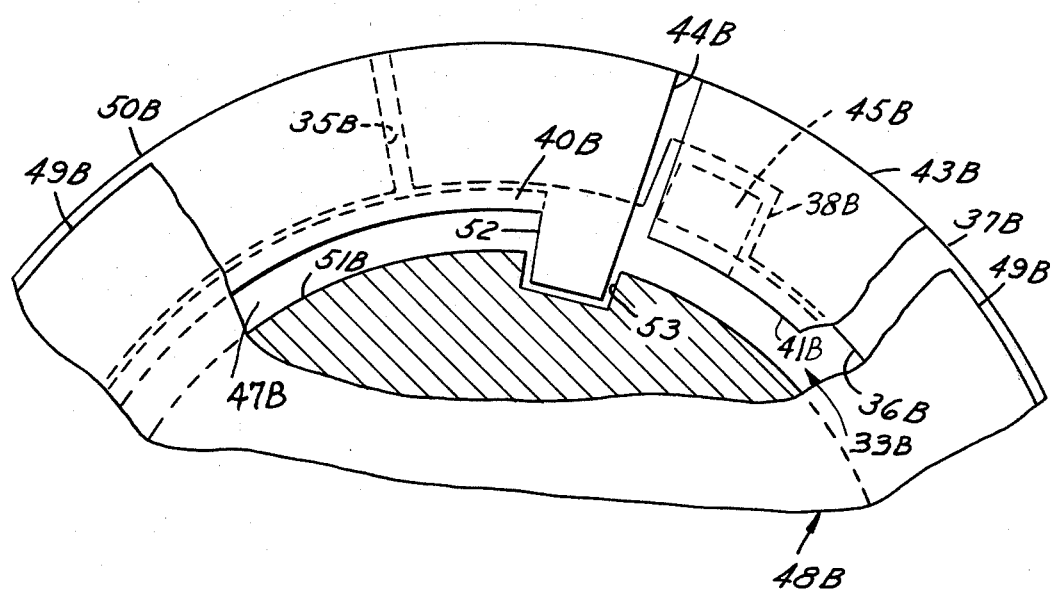
FIG. 21 is a fragmentary, top plan view of a modified piston ring gap seal of the type illustrated in FIGS. 12 through 19.

FIG. 21 illustrates another embodiment of the invention which comprises parts which are the same as the parts of the circumferential type piston ring gap seal made in accordance with the principles of the present invention, and which is illustrated in FIGS. 12 through 19. The parts of the ring gap seal in FIG. 21 which are the same as the parts of the circumferential type piston ring gap seal 39, illustrated in FIGS. 12 through 19, have been marked with the same reference numerals followed by the letter "B".

The embodiment of FIG. 21 is provided with an integral, inwardly turned flange 52 at the end of the seal wall portion 40B. Flange 52 extends into an adjacent index slot or locating slot 53 that is formed in the inner end wall 51B of the piston ring groove 33B. The ring gap seal 39B illustrated in FIG. 21 functions in the same manner as the prior embodiment of ring gap seal 39. The ring gap seal 39B is adapted for use in 2-cycle engines to prevent the piston ring gap 44B from traversing ports in cylinder wall 50B.

While it will be apparent that the preferred embodiments of the invention herein disclosed are well calculated to achieve the results aforestated, it will be appreciated that the invention is susceptible to modification, variation and change.

What is claimed is:

1. A ring gap seal for use in combination with a compression ring seated in a peripheral, rectangular ring groove on a piston, as in an internal combustion engine, an air compressor, a pump, or a refrigerator pump, and a rotating shaft seal ring, and wherein the ring groove has a top end wall, a bottom end wall, and an inner end wall and the compression ring has a gap formed therethrough, characterized in that the ring gap seal includes:
   (a) a first portion for seating on the top side of the compression ring to cover the upper side of the ring gap and seal the same;
   (b) a second portion, integrally connected to the first portion, and disposed at an angle thereto on the inner side of the compression ring to cover the inner side of the ring gap, and for mating abutment against the bottom end wall of the ring groove to cover the lower end of the inner side of the ring gap to seal the same against pressure leakage from inside of the compression ring to the outside thereof along the bottom of the ring; and,
   (c) means for preventing relative rotation between the compression ring and the ring gap seal without creating any pressure leakage path across the bottom of the compression ring from the inside thereof.

2. A ring gap seal as defined in claim 1 characterized in that:
   (a) said first portion includes a seal lip portion; and,
   (b) said second portion includes an integral inner wall portion.

3. A ring gap seal as defined in claim 2, characterized in that:
   (a) a spring arm is integrally attached to each end of the inner wall portion and each spring arm seats against the inner end wall of the ring groove.

4. A ring gap seal as defined in claim 3, characterized in that:
   (a) said means for preventing relative rotation includes a slot formed in the upper surface of the ring over the ring gap; and,
   (b) said seal lip portion is disposed in said slot over the ring gap.

5. A ring gap seal as defined in claim 4, characterised in that:
   (a) each of said spring arms is provided with a notch communicating with the slot formed in the upper surface of the compression ring to allow passage of gas pressure to flow through said slot and each of said notches and into the ring groove behind the ring gap seal to bias the ring gap seal into sealing engagement with the top side and the inner side of the ring gap in the compression ring, and with the bottom end wall of the ring groove.

6. A ring gap seal as defined in claim 5, characterized in that:
(a) the ring groove is provided with a pair of spaced apart index slots in the inner end thereof; and,
(b) each of the spring arms is provided with an index flange for seating engagement in one of the index slots.

7. A ring gap seal as defined in claim 1, characterized in that:
(a) said first portion includes an annular flange for seating on the top side of the ring to seal on and cover the upper side of the ring gap and seal the same; and,
(b) said second portion includes an annular cylindrical wall portion integrally connected to the annular flange at the inner periphery thereof, and disposed at an angle thereto, for mating against the inner end of the ring gap to seal the same.

8. A ring gap seal as defined in clam 7, characterized in that:
(a) the ring has an index slot formed in the inner periphery thereof; and,
(b) the ring gap seal has an index tab formed on the annular cylindrical wall portion for seating in said index slot.

9. A ring gap seal as defined in claim 8, characterized in that:
(a) the ring gap seal is provided with a radial gap to allow passage of gas pressure to flow through the radial gap into the ring groove behind the ring gap seal to bias the ring gap seal into sealing engagement with the upper side and rear end of the ring gap in the ring.

10. A ring gap seal as defined in claim 9, characterized in that:
(a) the piston is provided with an index slot in the inner end of the piston ring groove; and,
(b) the ring gap seal has an inwardly formed index tab for seating in said index slot.

* * * * *

UNITED STATES PATENT OFFICE
CERTIFICATE OF CORRECTION

Patent No. 4,358,121　　　　　　　　Dated　　November 9, 1982

Inventor(s)　Darrel R. Sand

It is certified that error appears in the above-identified patent and that said Letters Patent are hereby corrected as shown below:

```
Column 3, line 57, after "integral" insert --central--
Column 4, line 13, delete "and".
Column 4, line 15, after "face" insert --26--.
Column 7, line 14, delete "seal" and insert --seat--.
Column 8, line 1, delete "clam" and insert --claim--.
```

*Signed and Sealed this*

*Twenty-second* Day of *February 1983*

|SEAL|

*Attest:*

GERALD J. MOSSINGHOFF

*Attesting Officer*　　*Commissioner of Patents and Trademarks*